(12) United States Patent
Chauvin et al.

(10) Patent No.: US 10,110,092 B2
(45) Date of Patent: Oct. 23, 2018

(54) POWER GENERATOR ASSEMBLY

(71) Applicant: HeliosAltas Corp., Roseville, CA (US)

(72) Inventors: Phillip Chauvin, Lincoln, CA (US); Michael Thomas Carroll, Roseville, CA (US)

(73) Assignee: HeliosAltas Corp., Roseville, CA (US)

( * ) Notice: Subject to any disclaimer, the term of this patent is extended or adjusted under 35 U.S.C. 154(b) by 5 days.

(21) Appl. No.: 15/169,241

(22) Filed: May 31, 2016

(65) Prior Publication Data

US 2016/0348638 A1 Dec. 1, 2016

Related U.S. Application Data

(60) Provisional application No. 62/168,943, filed on Jun. 1, 2015.

(51) Int. Cl.
| | |
|---|---|
| *F03B 13/10* | (2006.01) |
| *H02K 7/18* | (2006.01) |
| *H02K 16/00* | (2006.01) |
| *F03B 17/06* | (2006.01) |
| *H02K 21/22* | (2006.01) |

(52) U.S. Cl.
CPC ......... *H02K 7/1823* (2013.01); *F03B 17/063* (2013.01); *H02K 16/00* (2013.01); *F05B 2220/706* (2013.01); *F05B 2250/411* (2013.01); *H02K 21/22* (2013.01); *H02K 2213/12* (2013.01); *Y02E 10/28* (2013.01); *Y02E 10/38* (2013.01)

(58) Field of Classification Search
CPC ...... H02K 7/1823; H02K 16/00; H02K 21/22; F03B 17/063; Y02E 10/28; Y02E 10/38

USPC ....................................................... 290/43, 54
See application file for complete search history.

(56) References Cited

U.S. PATENT DOCUMENTS

| | | | | |
|---|---|---|---|---|
| 2,465,285 | A * | 3/1949 | Schwickerath | F03B 17/06 416/162 |
| 4,270,056 | A * | 5/1981 | Wright | F03B 17/063 290/54 |
| 4,449,889 | A * | 5/1984 | Belden | F03D 7/0216 416/10 |
| 4,525,122 | A * | 6/1985 | Krnac | F03D 5/06 416/80 |
| 4,636,141 | A * | 1/1987 | Sedlacek | F03B 17/063 290/43 |
| 5,430,332 | A * | 7/1995 | Dunn, Jr. | F03B 7/00 290/43 |
| 6,246,125 | B1 | 6/2001 | Axtell | |
| 8,456,031 | B1 | 6/2013 | Hull et al. | |
| 8,536,725 | B2 | 9/2013 | Lakhani | |
| 8,692,404 | B2 | 4/2014 | Chauvin | |

(Continued)

OTHER PUBLICATIONS

International Searching Authority, "Notification of Transmittal of the International Search Report and The Written Opinion of the International Searching Authority", for PCT/US2016/035298, dated Oct. 13, 2016, 10 pages.

*Primary Examiner* — Sean Gugger
(74) *Attorney, Agent, or Firm* — Zarley Law Firm, P.L.C.

(57) ABSTRACT

A power generator assembly having a housing with a hollow chamber or shell. Received within the shell is a canister having generator sets. The housing and generators are mounted to a rotatable shaft that is connected to an anchor stand. The anchor stand has a lever with a counter weight that resists anchor torque.

19 Claims, 4 Drawing Sheets

(56) References Cited

U.S. PATENT DOCUMENTS

| | | |
|---|---|---|
| 9,041,260 B2 | 5/2015 | Ramey |
| 2005/0017513 A1* | 1/2005 | Sipp ................... F03B 17/063 290/54 |
| 2006/0137355 A1 | 6/2006 | Welch et al. |
| 2009/0200888 A1* | 8/2009 | Tanaka ................... H02K 3/12 310/195 |
| 2010/0247343 A1 | 9/2010 | Shimizu et al. |
| 2011/0031750 A1 | 2/2011 | Kreissig |
| 2011/0057442 A1* | 3/2011 | Chauvin ............ F03B 17/063 290/43 |
| 2011/0140436 A1* | 6/2011 | Saavedra ................ F03B 17/00 290/54 |
| 2011/0291413 A1* | 12/2011 | Wamble, III ........... B60L 13/04 290/44 |
| 2012/0223530 A1* | 9/2012 | Lee ..................... H02K 7/1823 290/1 C |
| 2013/0249216 A1* | 9/2013 | Chauvin ............... F03B 17/063 290/54 |
| 2014/0375058 A1* | 12/2014 | Chan ..................... F03B 13/20 290/53 |

\* cited by examiner

POWER GENERATOR ASSEMBLY

CROSS-REFERENCE TO RELATED APPLICATIONS

This application claims priority to Provisional Application U.S. Ser. No. 62/168,943 filed on Jun. 1, 2015, which is herein incorporated by reference in its entirety.

BACKGROUND OF THE INVENTION

This invention is directed toward a power generator assembly and, more particularly, a hydro generator assembly having removable generator sets and an anchoring system.

Hydroelectric generating systems are well-known in the art for utilizing water energy to generate electricity. While useful for their purpose, current systems have difficulty pulling maximum energy from a wide level of water flow. In addition, as water pressure increases and/or debris becomes lodged underneath the generator assembly, difficulty in resisting anchor torque on the assembly in a cost effective manner exists. Therefore, there is a need in the art for an assembly that addresses these deficiencies.

As a result, an objective of the present invention is to provide a power generator assembly that can maximize energy pulled from a wide level of water flow.

Another objective of the present invention is to provide a power generator assembly that more economically resists anchor torque.

These and other objectives will be apparent to one of ordinary skill in the art based upon the following written description, drawings and claims.

SUMMARY OF THE INVENTION

A power generator assembly has a housing with a side wall, end walls, and a hollow shell and a drive shaft that extends through central openings in the end walls. A canister, received within the shell, has a plurality of generator sets where the generators are mounted to the drive shaft.

The drive shaft is connected to and supported by an anchor stand. Preferably, the anchor stand has a support rod rotatably connected to and extending between support ends. Connected to and extending between the support rod and the drive shaft are a pair of pivot members. Also connected to the support rod at a first end is a lever having a counter weight at the opposite end.

DETAILED DESCRIPTION OF THE PREFERRED EMBODIMENT

Figure 1:
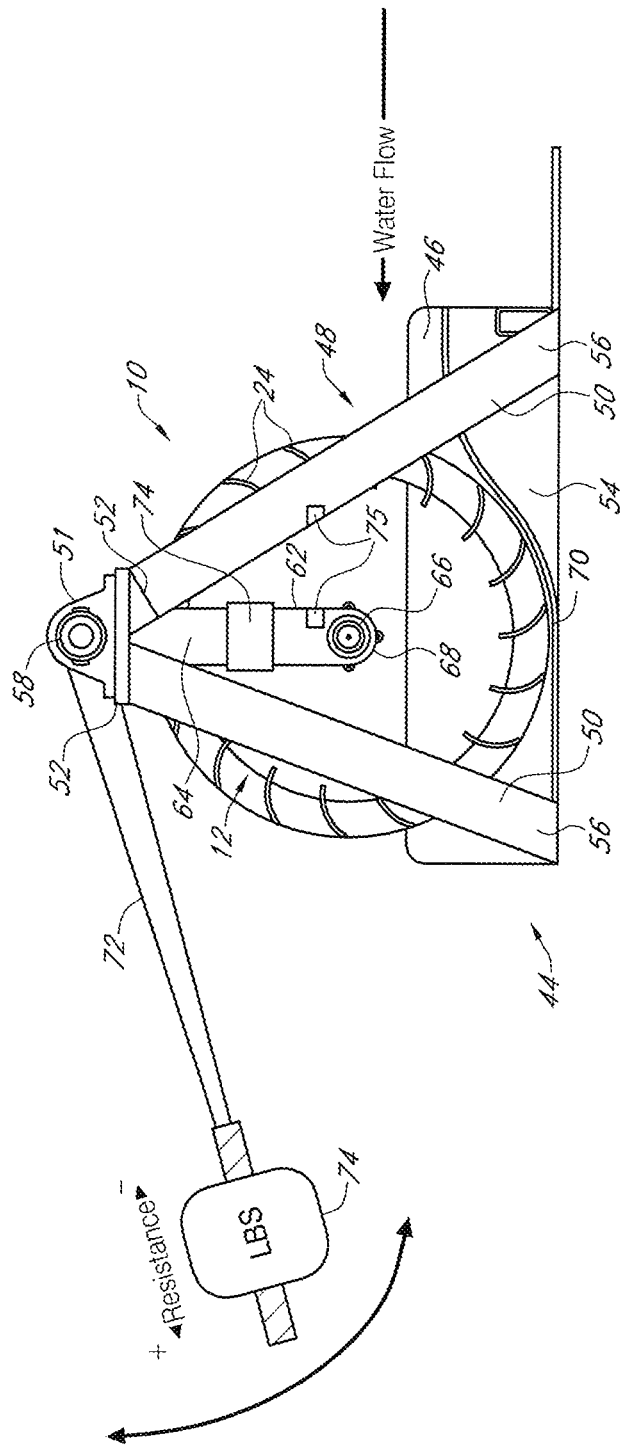
FIG. 1 is a side view of a power generator assembly and anchor stand.
Figure 2:
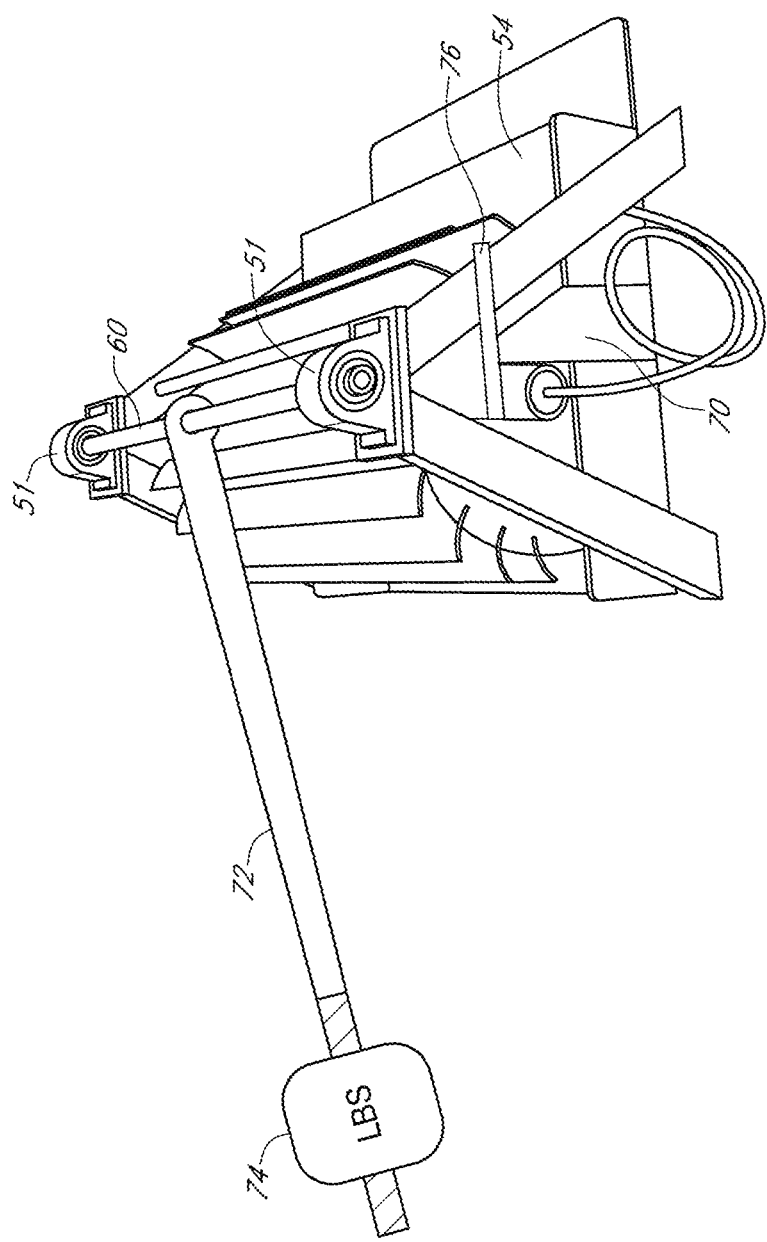
FIG. 2 is a perspective view of a power generator assembly and anchor stand.
Figure 3:
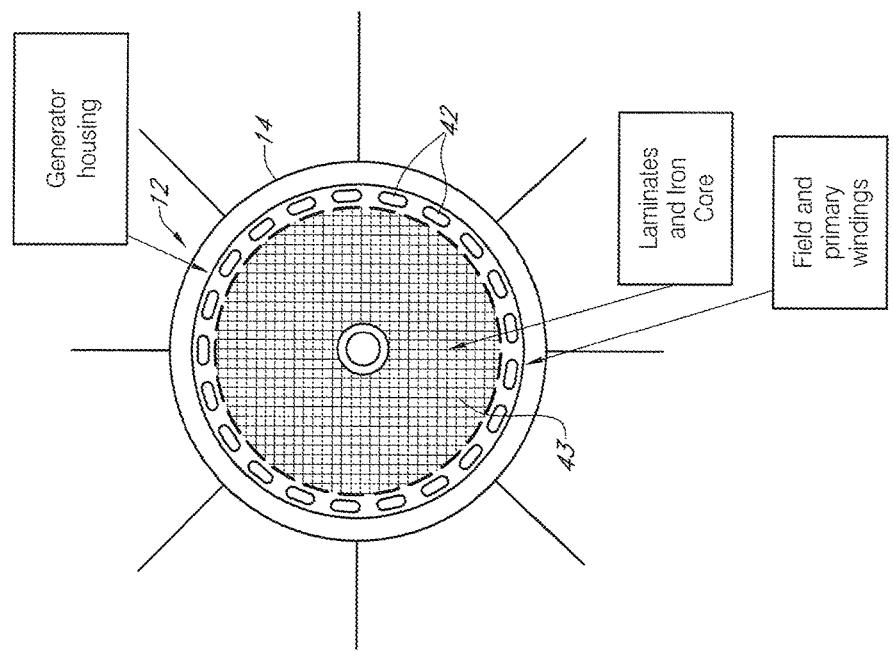
FIG. 3 is an end view of a generator.
Figure 4:
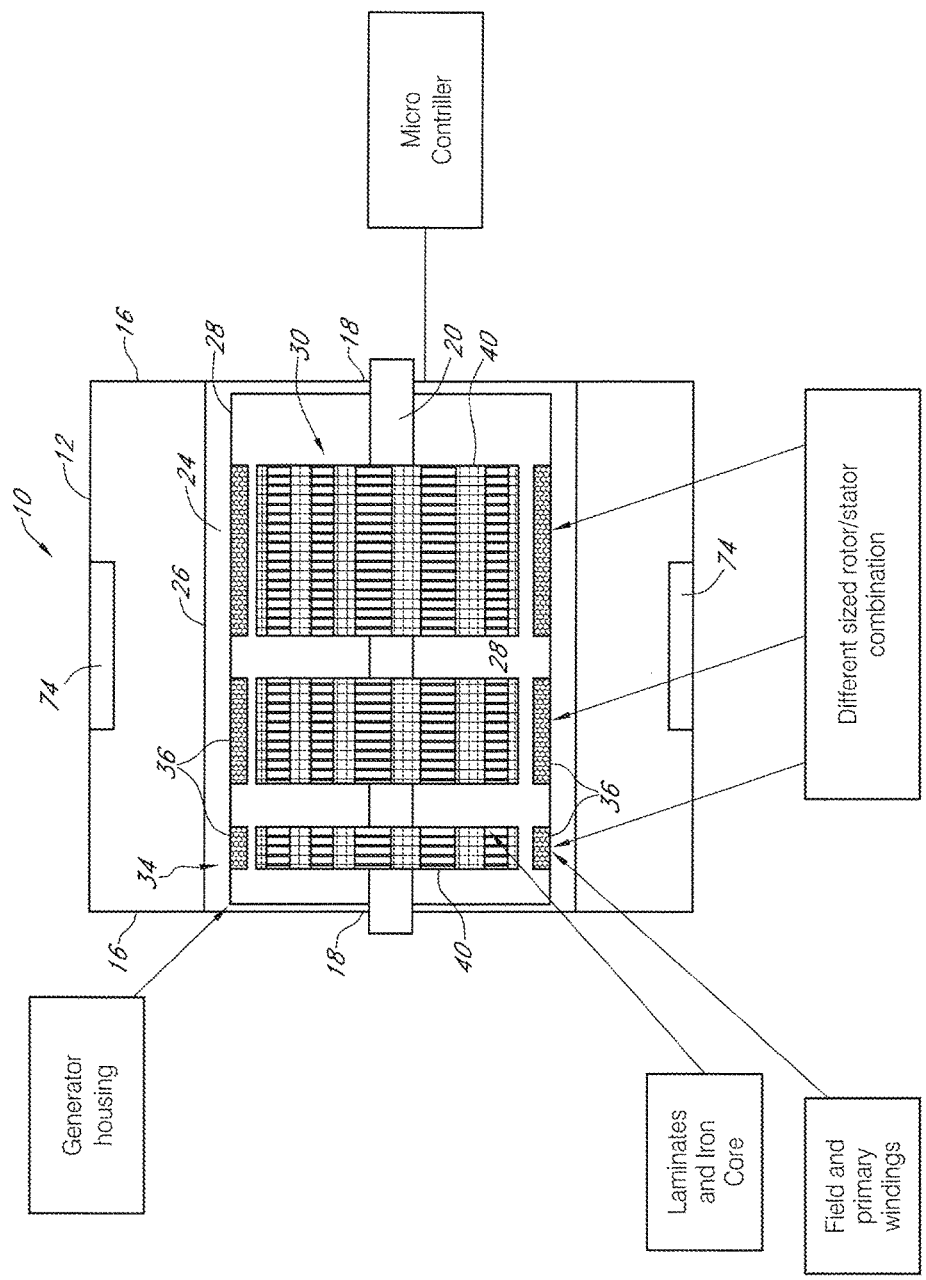
FIG. 4 is a side sectional view of a power generator assembly.

Referring to the Figures, a power generator assembly 10 has a housing 12 with a sidewall 14 and a pair of end walls 16. The end walls 16 have central opening 18, through which a rotatable shaft 20 extends. Positioned around an outer surface 22 of the side wall 19 are a plurality of fins 24. The housing 12 has a hollow chamber 26 that forms a shell 26.

The shell 26 is formed to receive canisters 28 that receive a single generator or a plurality in a generator sets 30. The generator sets 30 preferably are of different sizes and are connected to a micro controller 32 so that maximum energy may be pulled from a wide level of water flow.

Each generator 34 in a generator set 30 includes a magnetic stator 36 attached to an interior wall 38 of the canister 28. A rotor 40 having field and primary windings 42 that are wrapped around laminates and an iron core 43 is attached to the rotatable shaft 20.

An anchor stand 44 is used to support the generator assembly 10 in a body of water 46. The anchor stand has a pair of end supports 48. Each end support 48 has a pair of support legs 50 that support a bracket bearing 51 at a first end 52. The support legs 50 angle outwardly from the first end 52 where they are attached to a base 54 at a second end 56.

The bracket bearings 51 have openings 58 that receive a rotatable support rod 60. Fixedly attached to the support rod 60 are pivot members 62. The pivot members 62 are attached to the rod 60 at a first end 64 and have an opening 66 at the opposite end 68 that receives the ends of the rotatable shaft 20.

A stop 70 is attached to the base 54 and extends upwardly. The stop 70 is positioned to engage at least one pivot member 62 to prevent rotation of the pivot member 62 in rearward direction.

Fixedly attached to the support rod 60, between end supports 48, is a lever 72. The lever extends outwardly from the generator assembly 10 toward a down-stream side. A weight 74 is removably attached to an outer end 76 of the lever 72.

In operation, a canister 28 having a desired generator set 30 is inserted into a shell 26 and the rotatable shaft 20, and then sealed. The generator assembly 10 is mounted to the anchor stand 44 by inserting the rotatable shaft 20 into the openings 66 at end 68 of the pivot member 62.

The anchor stand 44 and generator assembly 10 are then placed either partially or completely with a flowing body of water 46. The water 46, as it flows past the generator assembly 10, engages fins 24 causing the housing 12, shaft 20, and rotors 40 to rotate in relation to the pivot members 62. As the rotor windings 42 pass through the magnetic fields produced by north and south stator magnets 36, electricity such as DC voltage is produced. The produced voltage is transmitted through the shell 26 to an exterior environment that includes converters substations, batteries and other storage or transmission devices.

As water pressure increases and/or debris becomes lodged underneath the generator assembly, the additional pressure causes the pivot members 62 to pivot toward the down-stream side. The pivoting movement of the pivot members 62 not only raises the generator assembly 10, but also rotates support rod 60. The rotation of the support rod 60 causes the lever 72 to rise in relation to the body of water 46. The weight 74 can be moved along the length of the lever 72 or more or less adjust the amount of resistance provided to the generator assembly.

The counter weight 74 provides a mechanical means to provide resistance to anchor torque and reduces costs when compared to electro-mechanical methods of monitoring. Further, by placing the lever 72 downstream of the generator assembly, less counter weight 74 is needed. Alternatively, counter weight is provided in a number of ways. As one example, weight 74 is added to pivot members 62 or high powered magnets 75 are used to hold pivot members 62 in a desired, predetermined position. Alternatively, weight 74 is added to the drum through thicker walls or weights placed inside the drum. Finally, resistance is provided by a flexible strap 76, such as, a bungee cord or the like, that extends around pivot member 62 and a stationary piece, such as, a support leg 50.

Canisters 28 having different generator sets 30 are quickly inserted into shells 26 and providing a direct drive configuration leads to higher efficiency. Also, matching the number of poles in the generators to the RPM of the generator assembly allows one generator set to fit a wide range of operating volumes and velocities.

What is claimed:

1. A power generator assembly, comprising:
   a housing having a side wall and end walls;
   the housing having a hollow chamber that forms a shell;
   a canister received within the shell, wherein the canister is formed to receive at least one generator, wherein the at least one generator includes magnetic stators attached to an interior wall of the canister and a rotor having rotor windings wrapped around laminates and an iron core that are attached directly to a rotatable shaft; and
   the rotatable shaft extends through central openings in the end walls.

2. The assembly of claim 1 wherein an anchor stand supports the assembly in a body of water.

3. The assembly of claim 1 wherein counter weights are positioned inside the housing.

4. The power generator assembly of claim 1 further comprising an additional generator having a different size than the at least one generator.

5. The power generator assembly of claim 1 wherein when the housing and rotatable shaft rotate, the rotor windings attached to the rotatable shaft pass by the magnetic stators electricity is produced.

6. A power generator assembly, comprising:
   a housing with at least one generator disposed within the housing;
   an anchor stand having a pair of pivot members with an opening in each pivot member;
   a rotatable shaft received through a central opening of the housing and the opening in the pair of pivot members;
   the anchor stand having a lever with a counter weight attached, that supports the housing in a body of water; and
   wherein the counter weight is moveable along the length of the lever such that the amount of resistance upon the generator assembly is adjusted.

7. The assembly of claim 6 wherein the anchor stand has a pair of end supports that are rotatably connected to a support rod that extends between the end supports.

8. The assembly of claim 7 wherein the lever and the pair of pivot members are attached to the support rod.

9. The assembly of claim 8 wherein the pivot members have counter weights attached.

10. The assembly of claim 8 wherein flexible straps extend around the pivot members and the anchor stand.

11. The assembly of claim 8 wherein the pivot members are held in a predetermined position by magnets.

12. A power generator assembly, comprising:
    a housing with at least one generator disposed within the housing;
    an anchor stand, having a lever with a counter weight attached, that supports the housing in a body of water;
    the anchor stand having a pair of end supports rotatably connected to a support rod that extends between the end supports;
    a pair of pivot members attached to the support rod;
    a rotatable shaft received through a central opening of the housing and an opening in the pair of pivot members;
    a plurality of support legs attached to a base of the anchor stand; and
    a stop attached to the base.

13. The power generator assembly of claim 12 wherein the stop is positioned to engage at least on pivot members such that rearward rotation of the pivot member is prevented.

14. The power generator assembly of claim 6 wherein the anchor stand and housing are positioned in the body of water.

15. The power generator assembly of claim 12 wherein each support leg extends outwardly from a first end connected to a bracket bearing to a second end attached to the base.

16. The power generator assembly of claim 12 wherein the pivot members are fixedly attached to the support rod at a first end and attached to the rotatable shaft at the opposite end.

17. The power generator assembly of claim 12 wherein the lever is fixedly attached to the support rod.

18. The power generator assembly of claim 12 wherein the lever extends outwardly from the housing toward a down-stream side.

19. The power generator assembly of claim 12 wherein the weight is removably attached to an outer end of the lever.

* * * * *